May 27, 1930. A. A. THOMAS 1,760,291
INDICATING DEVICE
Original Filed Aug. 24, 1925
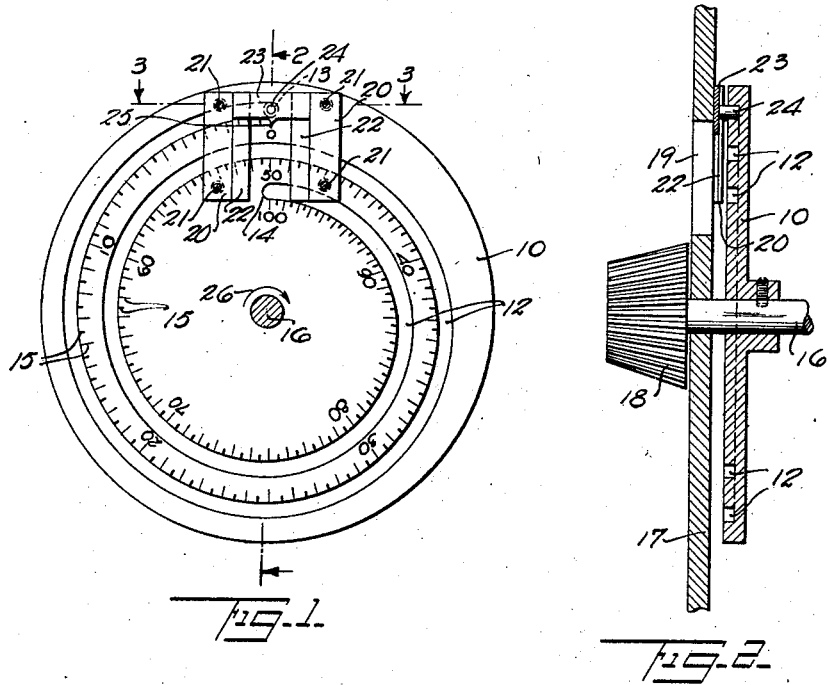
Fig. 1.
Fig. 2.
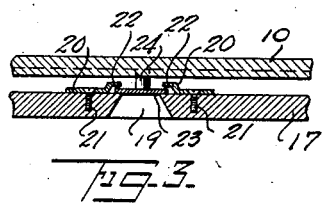
Fig. 3.
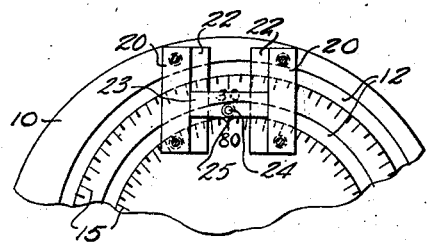
Fig. 4.
INVENTOR
Adolph A. Thomas Patented May 27, 1930

1,760,291

UNITED STATES PATENT OFFICE

ADOLPH A. THOMAS, OF NEW YORK, N. Y.

INDICATING DEVICE

Original application filed August 24, 1925, Serial No. 51,915. Divided and this application filed March 20, 1929. Serial No. 348,444.

My invention is for an indicator of novel construction particularly adapted for use in variable condenser and other electrical tuning instruments. The characteristic feature of this invention is a spiral scale covering more than 360 degrees, which enables me to graduate the scale with more and wider divisions than are possible on the circular scales of prior dials. In condenser dials or drums heretofore used in radio receivers, the reading can not possibly cover more than one full turn of the dial shaft (and usually only half a turn), so that the maximum scale length available is 360 degrees. Manifestly, this limited space necessitates narrow divisions and makes it difficult to print all the stations wave lengths or frequencies on the dial. Furthermore, stations on short wave lengths are crowded at the low end of the dial and are difficult to separate. All these and other difficulties are avoided in my new indicator, where the spiral scale may be extended to any practical limit for calibration with widely spaced marks.

The novel features and advantages of this invention will be understood from a description of the accompanying drawings, in which—

Fig. 1 shows a face view of a spiral indicator embodying my invention, the supporting panel being omitted;

Fig. 2 represents a vertical section on line 2—2 of Fig. 1;

Fig. 3 is a section on line 3—3 of Fig. 1; and

Fig. 4 is a fragmentary view similar to Fig. 1, showing a different position of the indicating shutter.

A disk or dial 10 is formed on its front face with a spiral groove or slot 12, which begins at 13 and ends at 14, these two points being 720 degrees of rotation apart. Along the spiral groove 12 is marked a spiral scale 15, which is arbitrarily divided into 100 points. The disk 10 is fixed on a shaft 16, which is supposed to be connected to the movable member of a tuning device in proper gear ratio, so that it takes more than one turn of disk 10 to adjust the tuning device from minimum to maximum value. The most common form of tuning device used in radio receiving nowadays is a condenser or a gang of condensers. The shaft 16 extends through a support 17, which may be the front panel of a radio cabinet, and is operated by means of a knob 18. The panel 17 has a window or sight opening 19. Back of this window are mounted two oppositely arranged guides 20, which are secured in properly spaced relation on the back of the panel by screws 21, or otherwise. The guide pieces 20 are formed with parallel offset flanges 22 between which slides a shutter 23 carrying a pin 24. This pin projects rearwardly into the spiral groove 12. The shutter 23 is at its lower edge formed with a pointed projection 25 arranged centrally of the scale window 19. The projection 25 acts as an indicating pointer and may be appropriately colored for an easy reading of the scale.

When the dial 10 is in normal or zero position, as indicated in Fig. 1, the slidable shutter 23 is in its uppermost position, and the pointer 25 indicates the zero mark on the scale. If we now imagine the knob 18 turned clockwise, as indicated by arrow 26 in Fig. 1, the shutter 23 will be automatically adjusted into a position where the pointer 25 always stands over the proper mark on the spiral scale 15. In other words, as the spiral edge of scale 15 turns in toward the center of the disk, the spiral groove 12 gradually moves the shutter 23 radically and maintains it in proper alignment with the changing periphery of the scale. The innermost position of shutter 23 is reached in this instance when the dial has received two complete turns in a forward direction. When the dial 10 is turned backward, the indicating shutter 23 is pushed up in a radial direction into the correct indicating position. It is obvious that the spiral scale 15 can be extended over a greater length than two turns of the dial, and the construction illustrated is to be considered merely as an example of how this feature of my invention may be embodied in practical form.

Although I have shown and described a specific construction, I do not consider my invention limited to the details set forth. Changes and modifications will probably occur to others within the scope of the appended claims. This case is a division of my copending application Serial Number 51,915, filed August 24, 1925.

I claim as my invention:

1. Dialing means for radio use including a rotatably mounted dial having progressively numbered divisions arranged thereon in a plurality of spiral turns about the center of mounting, a spiral abutment rotatable with the dial coextensive with the spiral turns and having substantially the same pitch as that of the spiral turns, a guide and an indicator mounted in the guide engaging the abutment, said indicator having radial movement across the dial adapted to abut upon each indicating number of said divisions.

2. Radio dialing means including a rotating dial having station indicating characters thereon arranged in progressively increasing value throughout a plurality of complete spiral turns surrounding the dial center, a spirally formed abutment rotatable with the dial, the same being coextensive with and of substantially the same pitch as said spiral turns of characters, a guide, and an indicator mounted in the guide engaging the abutment, said indicator having movement radially across the dial due to said abutment and adapted to abut upon and follow the spiral turns of said characters throughout the several rotations of the dial.

3. A radio dialing mechanism including a condenser shaft, a dial-plate affixed to and revoluble with said shaft and provided with a continuous spiral abutment having a plurality of turns around the center of dial rotation, said dial-plate having indicated divisions arranged thereon in a spiral or scroll corresponding to that of the abutment, and an indicator mounted to traverse the dial radially, and engaging the spiral abutment of said dial plate, said indicator following in its radial movement the spirally arranged indicating divisions.

4. Dialing mechanism including a condenser-shaft, a mounted dial-plate adapted to rotate in the rotation of the shaft, said dial-plate having numbered divisions denoted thereon arranged in a spiral or scroll, the numbers of said divisions increasing in value toward the center of rotation, a spirally formed abutment on the face of the dial-plate, an indicator overlying the dial and engaging the abutment, the same adapted to be moved radially of said dial, and a mounting in which the indicator is guided.

5. Radio dialing mechanism including with the shaft of a condenser, a dial-plate fixed with respect to said shaft to rotate therewith, and having a series of equally spaced characters on its face to indicate station settings and arranged in a plurality of spiral turns, a spirally arranged abutment rotatable with the dial-plate, the same corresponding in direction and pitch to said turns, being substantially coextensive with the latter, a guide, and an indicator mounted in the guide engaging the abutment and extending between a given turn of said abutment and a corresponding turn of the said plurality of spiral turns of characters, following the spiral turns in the rotation of said dial-plate.

6. In a dial mechanism, the combination of a rotatable condenser shaft, a mounted dial rotatable with the shaft at the same rate therewith, said dial including numbered divisions arranged in a spiral, the numbers of the divisions increasing in value as they approach the center of rotation of said dial, a spirally formed abutment mounted to rotate with the shaft and dial at the same rate therewith and having the same pitch as that of the spirally arranged divisions, a guide, and an indicator mounted in the guide overlying the dial and engaging and moved by the said abutment.

7. In a dial mechanism, the combination with a condenser shaft, a dial-plate affixed thereto and having a spirally cut groove therein, a dial on said plate having numbered divisions arranged in a spiral conforming in pitch and direction to the said groove, a guide, and an indicator mounted in the guide and engaging in the groove and adapted to be moved across the dial in a radial direction.

8. Radio dialing means including a dial adapted to rotate having a series of characters on its face each of a different reading for indicating separate station settings arranged in a continuous spiral turn about the center of the dial's rotation, an indicator, means to rotate the dial, and a part on the dial engaged by the indicator and fashioned to advance the latter radially across the dial at a rate of travel in proportion to the advance of the readings of the said characters on the dial during rotation, and guide means for such indicator.

9. Radio dialing means including a dial adapted to rotate having a row of characters of constantly increasing value arranged thereon about its center of rotation in a number of spiral turns, an indicator and a mounting therefor, and a part on the dial with which the indicator engages and by which the latter is advanced through a given uniform distance of travel in a full revolution of said dial, said part also adapted to continuously and uniformly advance said indicator during other dial rotations in the same direction.

10. In combination, a revoluble radio dial having numerals arranged thereon in a plurality of spiral turns about a common point and disposed in continuous substantially regular spaced relation throughout, the same constantly increasing in value and all said numerals being arranged in grouped columns arranged radially of said dial, an indicator, a support including a guide for the indicator, said guide lying radially of said dial, and a part on the dial with which the indicator engages operable in the rotation of the dial for moving said indicator radially across said dial.

11. In combination, a revoluble dial having numerals arranged thereon in increasing value throughout a plurality of spiral turns about a common point, all said numerals being grouped in substantially evenly spaced columns arranged in radial lines on said dial, the numerals of the separate columns increasing in value consecutively by the addition of a chosen constant, an indicator, a support including a guide for the indicator, said guide lying radially of said dial, and a part on the dial with which the indicator engages operable in the rotation of the dial for moving said indicator radially across said dial.

12. In combination with the shaft of a radio condenser, a dial having station indicia arranged in spiral order thereon, an indicator adapted to move across the face of the dial in a substantially radial direction, a support including a guide for the indicator, said guide lying radially of said dial and an abutment on the dial with which the indicator engages, one of the two elements first named operatively engaging said shaft and adapted in the rotation of the latter movable one with respect to the other.

13. In combination with the shaft of a radio condenser, a dial having station indicia arranged thereon in spiral order, an indicator adapted to move across the face of said dial toward and away from the center thereof, and cooperating means on said dial and indicator for guiding the movements of the latter, one of the two elements first named being connected to said shaft, whereby rotation of the shaft causes one of said elements to move with respect to the other.

14. A radio receiver having a front panel provided with a sight opening, an indicator movable vertically behind said opening, a rotary shaft projecting through said panel, a disk mounted on said shaft behind said panel and carrying a spiral scale visible through said opening, and an operative connection between said disk and said indicator whereby the latter moves relatively to said scale to indicate the correct reading thereof.

15. A radio receiver having a front panel provided with a sight opening, a pair of vertical guides secured to said panel on either side of said opening, an indicator movable in said guides behind said opening, a disk mounted on said shaft behind said panel and carrying a spiral scale visible through said opening, and an operative connection between said disk and said indicator whereby the latter moves relatively to said scale to indicate the correct reading thereof.

16. A radio receiver having a front panel provided with a sight opening, an indicator movable vertically behind said opening, a rotary shaft projecting through said panel, a disk mounted on said shaft behind said panel and carrying a spiral scale visible through said opening, said disk having a spiral groove running with said scale, and a lug projecting rearwardly from said indicator into said groove, whereby the indicator moves relatively to said scale to indicate the correct reading thereof.

ADOLPH A. THOMAS.